United States Patent [19]

Dawans

[11] Patent Number: 5,104,932
[45] Date of Patent: Apr. 14, 1992

[54] BITUMINOUS COMPOSITIONS CONTAINING RESIDUES OF HYDROLYZED OR ALCOHOLIZED POLYMERS

[75] Inventor: François Dawans, Bougival, France

[73] Assignee: Institut Francais du Petrole, Rueil Malmaison, France

[21] Appl. No.: 658,626

[22] Filed: Feb. 21, 1991

[30] Foreign Application Priority Data

Feb. 21, 1990 [FR] France ................. 90 02139

[51] Int. Cl.$^5$ ............................................ C08G 63/91
[52] U.S. Cl. ................................ 525/54.5; 525/408; 525/454
[58] Field of Search ......................... 525/54.5

[56] References Cited

U.S. PATENT DOCUMENTS 4,677,146 6/1987 Senz ................... 525/54.5
4,724,245 2/1988 Lalanne et al. ............ 525/54.5

*Primary Examiner*—Jacob Ziegler
*Attorney, Agent, or Firm*—Millen, White & Zelano

[57] ABSTRACT

The invention relates to bituminous compositions containing residues of polymers and in particular sterile car waste, which have previously undergone a hydrolysis and/or alcoholysis treatment prior to their incorporation into the bitumen or asphalt. The treatment is carried out in such a way as to hydrolyze and/or alcoholyze at least 5% by weight of the polyesters and/or polyurethanes initially contained in the polymer residues.

During the addition of the pretreated mixture of polymers to the bitumen or asphalt, it is preferable to add a catalyst and/or a reagent assisting the in situ condensation of the acids, alcohols, amines or isocyanates formed during the pretreatment and which react with one another or with certain constituents of the bitumen or asphalt.

The process permits a better incorporation of the polymer residues containing a fraction of polyurethane, polyester and/or polyepoxide resins and consequently makes it possible to obtain improved bituminous compositions for use in roads or industry.

12 Claims, No Drawings

BITUMINOUS COMPOSITIONS CONTAINING RESIDUES OF HYDROLYZED OR ALCOHOLIZED POLYMERS

BACKGROUND OF THE INVENTION

Polymers are at present used as additives in asphalts and bitumens used for roads or in industry, either for improving their workability by modifying the hot rheological properties, or for improving their physicochemical properties (cold brittleness, toughness, flexibility, stability, thermal susceptibility, mechanical strength with respect to shocks, vibrations, abrasions, etc.)

In general, the polymers used are thermoplastics (olefin copolymers or polymers), rubbers and in particular thermoplastic elastomers (multiblock copolymers of diolefins and styrene), or, to a lesser extent, thermosetting resins (polyurethanes, epoxy resin, phenol formaldehyde). According to the prior art, these polymers can be used alone or in mixture. For example, it has been proposed to recycle as additives in bitumens, production waste (waxes of polyethylene, atactic polypropylene, polyvinyl alcohol, powdered vulcanized rubber waste, etc.) or plastic waste from household refuse and more specifically plastic packing materials. In the latter case, the mixtures of polymers essentially contain polyolefins, polyvinyl chloride, polystyrene and polyethylene terephthalate.

The polymers are added in small quantities (generally 2 to 10% by weight) to bitumens, in the form of "simple" mixtures involving no chemical reaction or interaction between the constituents, or in the form of "complex" mixtures involving a chemical reaction or interaction between the polymer and certain constituents of the bitumen (asphaltenes, malthenes, resins, etc.), optionally in the presence of a third constituent (catalyst, reagent). Usually the polymers are dispersed in the solid or melted state in a previously heated excess of bitumen and, after stirring, the mixtures are either molten used state, or cooled to the solid state and optionally granulated or ground. Certain processes for the production of a mixture in the molten state of bitumens for roads to which have been added olefin polymers recommend the addition of at least 5 to 30% by weight of mineral particles, which speed up the dissolving of the polymer in the bitumen (cf., e.g., U.S. Pat. No. 3,336,252 published on Aug. 15, 1967). U.S. Pat. No. 4,028,293, published on June 7, 1977, claims the production of a bitumen-containing material more particularly used for roads and construction purposes and which is obtained by the high temperature reaction (at at least 180° C.) of a mineral compound, such as sand or gravel, with a polymer or a mixture of polymers obtained from domestic or household refuse. The resultant mixture is then added hot to the bitumen and cooled. A major disadvantage of this method is the final cost of the operation, which requires a preheating to high temperature of a significant quantity of mineral material prior to the addition of the polymer or polymers.

The present invention relates to a simplified, economic process for the recycling of polymer waste in bitumens for roads or industry. This process is particularly suitable for the recycyling of "sterile car waste", i.e., plastic waste resulting from the breaking up of cars and which may possibly contain other polymer waste materials in small proportions, e.g., resulting from the breaking up of electric domestic appliances.

The generic name "sterile car waste" or "car crushing waste" in fact designates all mineral and organic materials resulting from the crushing or cutting into pieces of in particular car bodies and to a lesser extent electric domestic appliances and industrial waste and obtained after the separation of the main metallic materials, e.g., by magnetic sorting processes, by gravitation or hydrocyclones, by flotation or performed manually. The recovered metallic materials are recycled as starting or raw materials for the metallurgical industry. However, the recycling of "sterile" or non-metallic waste at present constitutes a major problem due to the heterogeneity of the material which is a mixture having a variable composition and constituted by non-metallic mineral particles and various polymers such as expanded materials or foams, vulcanized rubber materials, synthetic fibers, thermoplastics and thermoset resins.

Bearing in mind the increasing quantities of polymer materials used in the construction of vehicles and electric household appliances, it has become necessary to find new means for getting rid of such sterile materials and which are satisfactory both from economic and ecological standpoints. It has already been proposed to dispose of most "sterile car waste" by incineration, as in the case of domestic refuse. Although the construction of specific incinerators for "sterile car waste" is technically possible, it does not at present constitute the most satisfactory solution from the energy and financial standpoints, bearing in mind the ecological constraints linked with ensuring the particulate removal from the combustion smoke and fumes and the prevention of discharges of toxic or corrosive gases. As in the case of plastic waste from packing and domestic refuse, consideration has also been given to the recycling of "sterile car waste" as second generation starting materials, used alone or mixed with new, first generation materials. However, in view of their more heterogeneous composition, the uses of "sterile car waste" as recycled materials have remained very limited up to now and have not made it possible to envisage a sufficiently large scale use to get rid of the increasing quantities thereof. Therefore most "sterile car waste" is at present stored in protected dumps, which involves ever higher storage costs and which, despite all the precautions taken, constitutes a relatively unsatisfactory solution from the environmental standpoint.

SUMMARY OF THE INVENTION

Therefore the use, according to the present invention, of "sterile car waste" for improving the properties of bitumens or asphaltes for use in roads and industry represents a useful and advantageous recycling means, at least if simple, reliable technology exists for producing the mixtures. Contrary to the prior art processes essentially limited to the recycling of domestic plastic refuse in bitumens, the improved process according to the present invention makes it possible to use more heterogeneous and complex mixtures of polymers, such as "sterile car waste".

The bitumen (asphalte) used according to the present invention is a natural constituent of mineral and crude oils. It is obtained by deasphalting, e.g., by propane precipitation, or by the distillation of refining products (pitch) and/or petroleum cracking products. It can also be obtained from coal tar.

Without exceeding the scope of the invention, it is also possible to use a bitumen fluxed e.g., with the aid of aromatic residues or distillates or an oxidized or blown bitumen.

The fundamental originality of the present invention consists of valorizing complex mixtures of organic polymers produced during the cutting into pieces and crushing of cars and to a lesser extent electric domestic appliances and industrial waste, while adding them to bituminous and asphalt binders and while improving certain properties with a view to their use in the coating of solid materials such as gravel, coatings or coverings and in particular in road construction, building, public works and special equipment.

The mixture of sterile car waste or other equivalent polymer residues is, if necessary, washed with water to eliminate dirt. It then undergoes a hydrolysis and/or alcoholysis treatment, so as to transform at least a fraction of the polyurethanes of the sterile waste into alcohols, isocyanates or amines and/or a fraction of the polyesters of the sterile waste into acids and alcohols. The treatment consists of heating to a temperature generally between 80° and 200° C. the sterile car waste in the presence of 1 to 50% by weight of water, alcohols, aminoalcohols, amines or carboxylic acids, based on the weight of the sterile waste, optionally accompanied by the addition of a catalyst such as alkali metal hydroxide, soda or caustic potash, a salt or metal oxide, or an alkali metal alkoxide, e.g., at a concentration of 0.5 to 5% by weight based on the weight of the alcoholysis or hydrolysis reagent. Treatment is appropriately continued up to the hydrolysis and/or alcoholysis of at least 5 and preferably 20 to 90% by weight of the polyesters and/or polyurethanes contained in the polymer residues. The thus obtained mixture is then stirred, while adding to it melted bitumen, so as to obtain a bituminous mixture containing 1 to 80% by weight polymers. The mixture is kept for at least 5 minutes at a temperature between 120° and 230° C. It is also possible to add small quantities, e.g., 0.5 to 15% by weight based on the weight of the polymers of a catalyst such as a mineral or organic acid and/or a reagent such as a polyanhydride, polyacid, polyamine, polyalcohol or a polyisocyanate, so as to aid the in situ condensation of the acids, alcohols, amines or isocyanates formed during the pretreatment. These compounds are able to react with one another or with certain constituents of the bitumen or asphalt. These polycondensation reagents and catalysts are known in the art and are preferably added to the bitumen or asphalt prior to the addition of the mixture of the pretreated polymers.

The process according to the invention permits a better incorporation of thermoset resins into the bitumen. It is therefore very appropriate for adding to bitumens or asphalt, sterile car waste containing a fraction of polyurethane, polyester and/or polyepoxide resins, at a concentration which is generally between 4 and 15% by weight based on the weight of the organic sterile material.

Preferably, prior to hydrolysis or alcoholysis, the polymer resins are reduced into powder form, the grains having an average size below 10 mm and preferably between 2 and 4 mm.

Without exceeding the scope of the invention, it is also possible to add a solvent, such as halogenated or aromatic hydrocarbon during the hydrolysis and/or alcoholysis treatment of the sterile car waste. The solvent is then eliminated by distillation or evaporation prior to the addition of the bitumen.

The following examples illustrate the invention.

EXAMPLE 1

2 kg of sterile car waste previously washed with water to eliminate dirt are mixed with 400 ml of a 1 mole aqueous solution of caustic potash and the mixture is heated in a stainless steel reactor at 140° C. for 20 minutes. This is followed by the addition of 4 kg of previously melted bitumen and the mixture is stirred for 10 minutes, then neutralized by the addition of hydrochloric acid and the water is distilled. To it are added 160 g of polyethylene glycol and 20 g of p-toluenesulphonic acid and the mixture is heated at 180° C. for 15 minutes before being cooled to ambient temperature.

The concentrated mixture of sterile car waste obtained under the above conditions has a homogeneous appearance and rapidly dissolves during its dilution in excess of bitumen.

EXAMPLE 2

To 5 kg of sterile car waste in the form of grains smaller than 10 mm are added 0.5 kg of tert. butyl alcohol and 10 g of sodium butylate diluted in 1 liter of chlorobenzene and the mixture is stirred at 90° C. for 20 minutes. The solvent is then distilled by heating the reaction mixture progressively to 160° C. To it are added 2.7 kg of bitumen and 0.6 kg of toluylene diisocyanate and the mixture is heated at 160° C. for 25 minutes in order to obtain a bituminous composition with a homogeneous appearance.

When this concentrated polymer mixture is added to 100 kg of bitumen having a softening point of 54° C. (measured according to the ASTM 36 ball and ring method), it rapidly disperses to give a bitumen formulation, whose softening point is 127° C.

I claim:

1. A process for obtaining an improved asphalt or bitumen composition containing polymer residues, comprising providing polymer residues containing polyurethanes, polyesters or mixtures thereof, subjecting said residues to hydrolysis, alcoholysis treatment or mixtures thereof to a degree of at least 5% by weight of the polyesters, polyurethanes or mixtures thereof, and reacting resultant polymer residues with a melted asphalt, bitumen or mixtures thereof in a proportion of 1 to 80% by weight based on the final composition.

2. A process according to claim 1, wherein said polymer residues are at least largely constituted by sterile car waste.

3. A process according to claim 1, wherein the hydrolysis, alcoholysis or mixtures thereof is conducted to a degree of 20% to 90% of the polyesters, polyurethanes or mixtures thereof contained in said polymer residues prior to its addition to the bitumen or asphalt.

4. A process according to claim 1, wherein the hydrolysis, alcoholysis treatment or mixtures thereof is carried out at a temperature between 80° and 200° C., in the presence of 1% to 50% by weight of a reagent chosen from among water, alcohols, aminoalcohols, amines, or carboxylic acids.

5. A process according to claim 4, wherein the hydrolysis, alcoholysis treatment or mixtures thereof is conducted with 0.5% to 5% by weight, based on the weight of a reagent or catalyst chosen from among metal oxides or salts and alkali metal alkoxides or hydroxides.

6. A process according to claim 1, further comprising addition of a coreagent, such as polyanhydride, polyacid, polyamine, polyalcohol, or a polyisocyanate, to the bitumen or asphalt prior to its addition to the hydrolysis, alcoholysis products or mixtures thereof of the polymer residues.

7. A process according to claim 1, wherein the hydrolysis, alcoholysis treatment or mixtures thereof is conducted with the addition of a catalyst chosen from among mineral or organic acids, which facilitates the polycondensation reaction of the hydrolysis, alcoholysis or mixtures thereof of the polyesters, polyurethanes or mixtures thereof within the bitumen or asphalt.

8. A process according to claim 1, wherein the reaction of the bitumen or the asphalt with the hydrolysis, alcoholysis products or mixtures thereof of the polymer residues is carried out at a temperature between 120° C. and 230° C. for at least 5 minutes.

9. A process according to claim 2, wherein the polymer residues contain 4% to 15% by weight of polyurethane, polyester, polyepoxide resins or mixtures thereof.

10. A bituminous composition obtained according to the process of claim 1.

11. A bitumen or asphalt containing a composition produced by a process comprising providing polymer residues containing polyurethanes, polyesters or mixtures thereof, subjecting said residues to hydrolysis, alcoholysis treatment or mixtures thereof to a degree of at least 5% by weight of the polyesters, polyurethanes or mixtures thereof and reacting resultant polymer residues with a melted asphalt, bitumen or mixtures thereof in a proportion of 1 to 80% by weight based on the final composition.

12. A composition for a road produced by a process comprising providing polymer residues containing polyurethanes, polyesters or mixtures thereof, subjecting said residues to hydrolysis, alcoholysis treatment or mixtures thereof to a degree of at least 5% by weight of the polyesters, polyurethanes or mixtures thereof, and reacting resultant polymer residues with a melted asphalt, bitumen or mixtures thereof in a proportion of 1 to 80% by weight based on the final composition.

* * * * *